(12) United States Patent
Nammi et al.

(10) Patent No.: US 10,476,703 B2
(45) Date of Patent: *Nov. 12, 2019

(54) FACILITATING DYNAMIC LAYER MAPPING WITH MULTIPLE DOWNLINK CONTROL CHANNELS FOR WIRELESS COMMUNICATION SYSTEMS

(71) Applicant: AT&T Intellectual Property I, L.P., Atlanta, GA (US)

(72) Inventors: SaiRamesh Nammi, Austin, TX (US); Milap Majmundar, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,470

(22) Filed: May 28, 2019

(65) Prior Publication Data

US 2019/0280901 A1    Sep. 12, 2019

Related U.S. Application Data

(63) Continuation of application No. 16/253,256, filed on Jan. 22, 2019, which is a continuation of application (Continued)

(51) Int. Cl.
*H04B 7/02* (2018.01)
*H04L 25/02* (2006.01)
(Continued)

(52) U.S. Cl.
CPC ....... *H04L 25/0226* (2013.01); *H04B 7/0413* (2013.01); *H04B 7/0417* (2013.01); *H04B 7/0473* (2013.01)

(58) Field of Classification Search
CPC .. H04B 7/0473; H04B 7/0413; H04B 7/0417; H04B 7/0669; H04L 25/0226; H04L 1/0618; H04L 1/06; H04L 25/0204
(Continued)

(56) References Cited

U.S. PATENT DOCUMENTS 8,811,516 B2    8/2014  Koivisto et al.
8,837,371 B2    9/2014  Su et al.
(Continued)

OTHER PUBLICATIONS

Baker et al., "LTE-Advanced Physical Layer", Alcatel-Lucent, REV-090003r1. Retrieved on May 23, 2017, 48 pages.
(Continued)

*Primary Examiner* — Zewdu A Kassa
(74) *Attorney, Agent, or Firm* — Amin, Turocy & Watson, LLP

(57) ABSTRACT

A system facilitating dynamic layer mapping with multiple downlink control channels wireless communication system is provided herein. In one example, a method, comprises: determining, by a BS device, for a selected mobile device, a type of downlink control channel configuration to transmit to a mobile device; and in response to determining to transmit multiple downlink control channels as the type of downlink control channel configuration, identifying a layer to couple to the downlink control channel configuration. Determining the type of downlink control channel configuration to transmit can comprise: determining to transmit multiple downlink control channels if a rank is higher than a defined value; and determining to transmit a single control channel in lieu of transmitting the multiple control channels if a rank is less than or equal to the defined value. The method can also include scheduling the layer for transmission to the mobile device.

20 Claims, 14 Drawing Sheets

Related U.S. Application Data

No. 15/588,333, filed on May 5, 2017, now Pat. No. 10,211,896.

(51) Int. Cl.
  *H04B 7/0456* (2017.01)
  *H04B 7/0413* (2017.01)
  *H04B 7/0417* (2017.01)

(58) Field of Classification Search
  USPC .................. 375/267, 260, 259, 316, 219
  See application file for complete search history.

(56) References Cited

U.S. PATENT DOCUMENTS

| | | | |
|---|---|---|---|
| 9,001,907 | B2 | 4/2015 | Chen et al. |
| 9,025,574 | B2 | 5/2015 | Mahalleh et al. |
| 9,124,532 | B2 | 9/2015 | Chen et al. |
| 9,178,589 | B2 | 11/2015 | Chen et al. |
| 9,385,792 | B2 | 7/2016 | Seo et al. |
| 9,590,710 | B2 | 3/2017 | Kotecha et al. |
| 9,590,780 | B2 | 3/2017 | Seo et al. |
| 2008/0225964 | A1* | 9/2008 | Han ............... H04B 7/0413 375/260 |
| 2012/0057490 | A1* | 3/2012 | Park ............... H04W 76/28 370/252 |
| 2016/0143055 | A1 | 5/2016 | Nammi et al. |
| 2016/0219457 | A1 | 7/2016 | Nammi et al. |
| 2016/0337056 | A1 | 11/2016 | Frenne et al. |
| 2016/0359647 | A1 | 12/2016 | Chen et al. |
| 2017/0094549 | A1 | 3/2017 | Nammi et al. |
| 2017/0295564 | A1* | 10/2017 | Tiirola ............... H04L 5/0053 |

OTHER PUBLICATIONS

Office Action dated Apr. 2, 2018 for U.S. Appl. No. 15/588,333, 18 pages.

Notice of Allowance dated Feb. 25, 2019 for U.S. Appl. No. 16/253,256, 16 pages.

Notice of References Cited dated Apr. 24, 2019 for U.S. Appl. No. 16/253,256, 3 pages.

* cited by examiner

| COMBINATION | PORT MAPPING |
|---|---|
| CSI-PROCESS 1 | 1 AND 2 AND 3 AND 4 |
| CSI-PROCESS 2 | 1 AND 3 AND 2 AND 4 |
| CSI-PROCESS 3 | 1 AND 4 AND 2 AND 3 |

FIG. 9

FACILITATING DYNAMIC LAYER MAPPING WITH MULTIPLE DOWNLINK CONTROL CHANNELS FOR WIRELESS COMMUNICATION SYSTEMS

RELATED APPLICATION

The subject patent application is a continuation of, and claims priority to each of, U.S. patent application Ser. No. 16/253,256, filed Jan. 22, 2019, and entitled "FACILITATING DYNAMIC LAYER MAPPING WITH MULTIPLE DOWNLINK CONTROL CHANNELS FOR WIRELESS COMMUNICATION SYSTEMS," which is a continuation of U.S. patent application Ser. No. 15/588,333 (now U.S. Pat. No. 10,211,896), filed May 5, 2017, and entitled "FACILITATING DYNAMIC LAYER MAPPING WITH MULTIPLE DOWNLINK CONTROL CHANNELS FOR WIRELESS COMMUNICATION SYSTEMS," the entireties of which applications are hereby incorporated by reference herein.

TECHNICAL FIELD

The subject disclosure relates generally to communications systems, and, for example, to systems, methods and/or machine-readable storage media for facilitating dynamic layer mapping with multiple downlink control channels wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

BRIEF DESCRIPTION OF THE DRAWINGS

FIG. 9 illustrates an example, non-limiting table to facilitate dynamic layer mapping with multiple downlink control channels in accordance with one or more embodiments described herein.

DETAILED DESCRIPTION

Figure 1:
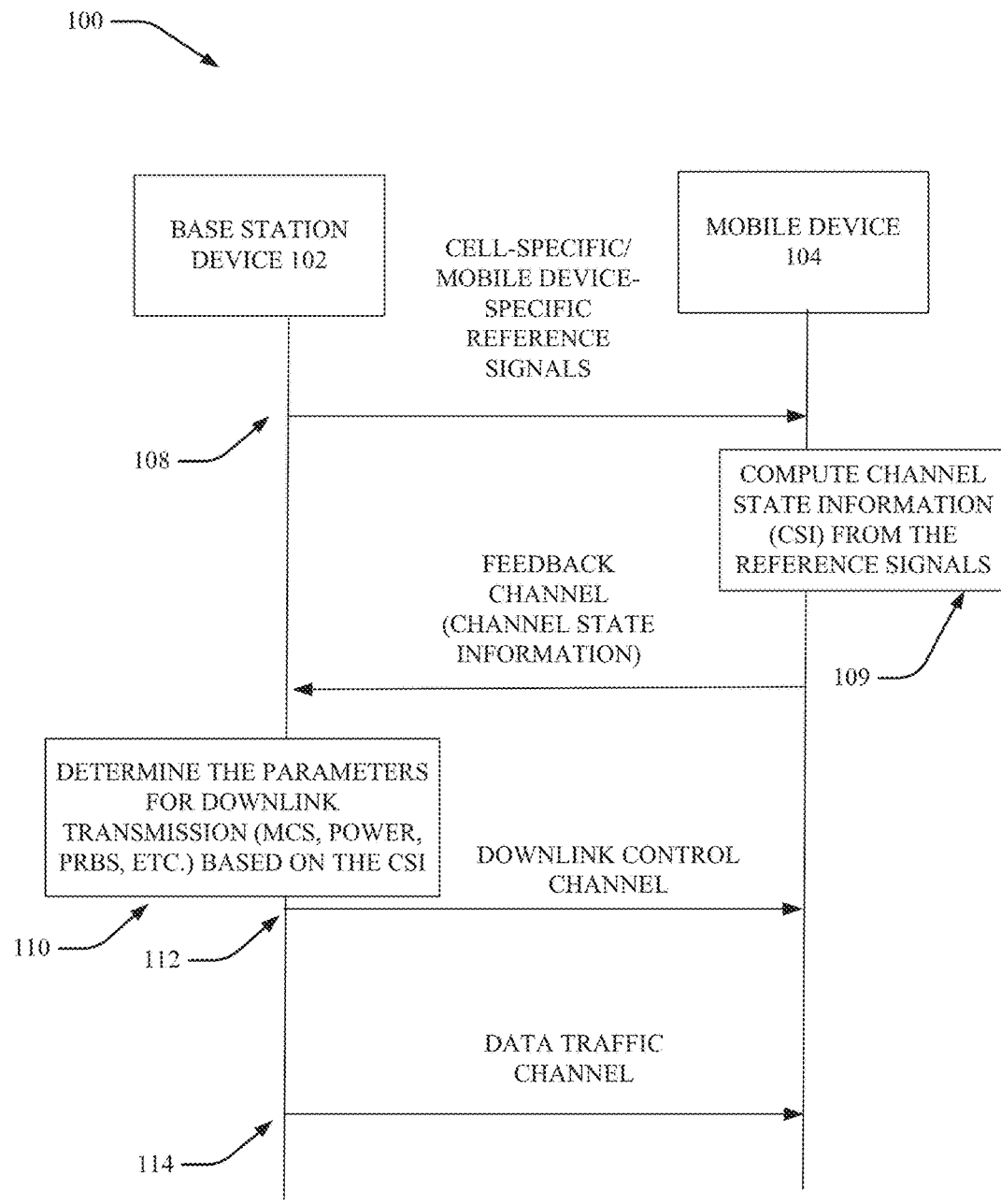
FIG. 1 illustrates an example, non-limiting message sequence flow chart to facilitate dynamic layer mapping with multiple downlink control channels in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

MIMO systems can significantly increase the data carrying capacity of wireless systems. For these reasons, MIMO is an integral part of the $3^{rd}$ and $4^{th}$ generation wireless systems. 5G systems will also employ MIMO systems also called massive MIMO systems (hundreds of antennas at the transmitter side and/receiver side). Typically, with a $(N_t, N_r)$ configuration, where $N_t$ denotes the number of transmit antennas and Nr denotes the receive antennas. As a result, the peak data rate typically multiplies with a factor of $N_t$ over single antenna systems in rich scattering environment.

The overhead due to downlink and uplink feedback signaling is typically reduced when MIMO codeword dimensioning is applied. However, the drawback with codeword dimensioning is that the link throughput is impacted as the MIMO layers with different channel qualities are coupled as one codeword. Hence an efficient solution is desired to improve the performance of MIMO system without impacting the uplink and downlink feedback channel overhead.

Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (NR) access. Accordingly, systems, methods and/or machine-readable storage media for facilitating incremental downlink control information (DCI) design to support DCI scheduling in a wireless communication system in accordance with one or more embodiments are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media facilitating dynamic layer mapping with multiple downlink control channels wireless communication system in accordance with one or more embodiments are provided herein. In one embodiment, an apparatus is provided. The apparatus can comprise: a processor; and a memory that stores executable instructions that, when executed by the processor, facilitate performance of operations. The operations can comprise: determining for a selected mobile device, a type of downlink control channel configuration to transmit to a mobile device; and in response to determining to transmit multiple downlink control channels as the type of downlink control channel configuration, identifying a layer to couple to the downlink control channel configuration.

In another embodiment, a method is provided. The method comprises: determining, by a base station device comprising a processor, for a selected mobile device, a type of downlink control channel configuration to transmit to a mobile device; and in response to determining to transmit multiple downlink control channels as the type of downlink control channel configuration, identifying, by the base station device, a layer to couple to the downlink control channel configuration.

In another embodiment, a machine-readable storage medium is provided. The machine-readable storage medium can comprise executable instructions that, when executed by a processor, facilitate performance of operations, comprising: determining, for a selected mobile device, a type of downlink control channel configuration to transmit to a mobile device; and in response to determining to transmit multiple downlink control channels as the type of downlink control channel configuration, identifying a layer to couple to the downlink control channel configuration.

One or more embodiments can provide one or more significant gains in sector throughput and/or base station device (BS device) or network cell edge user throughput. One or more embodiments can enable the legacy feedback channel to be used thus reducing the standardization effort for designing control channels for different codewords.

FIG. 1 illustrates an example, non-limiting message sequence flow chart to facilitate dynamic layer mapping with multiple downlink control channels in accordance with one or more embodiments described herein. As used herein, the term "BS device 102" can be interchangeable with (or include) a network, a network controller or any number of other network components.

One or more embodiments of system 100 can transmit data using single codeword MIMO and also concurrently achieve gains similar to multi codeword MIMO where the BS device 102 and/or network employs use of more than one scheduling grant channel such that multiple streams can be transmitted on each data traffic channel using the single codeword feedback channel. One or more embodiments of system 100 can enable the BS device 102 and/or the network to probe the mobile device 104 for a particular layer mapping (e.g., the best layer mapping) while using the legacy feedback channel (for single codeword). One or more embodiments can provide a method in which the network node: can determine whether to transmit multiple scheduling grants; probe to identify the layer mapping within a codeword; and/or transmit data using a selected (e.g., best) layer mapping combination.

FIG. 1 shows the typical message sequence chart for downlink data transfer in wireless communication (e.g., 5G, LTE, etc.) systems. As shown, one or more of reference signals and/or pilot signals can be transmitted as shown at 108 of FIG. 1. The reference signals and/or the pilot signals can be beamformed or non-beamformed. From the pilot or reference signals, the mobile device 104 can compute the channel estimates then compute the parameters needed for CSI reporting. The CSI report can include, but is not limited to, channel quality indicator (CQI), preceding matrix index (PMI), rank information (RI) CSI-RS Resource Indicator (CRI) (which can be the same as beam indicator), etc.

At 109, the CSI report can be sent to the BS device 102 and/or the network from the mobile device 102 via a feedback channel either on request from the BS device 102 and/or the network aperiodically or can be configured to report periodically. At 110, the BS device 102 scheduler and/or the network scheduler can use this information in choosing the parameters for scheduling of this particular mobile device 104. The BS device 102 and/or the network can send the scheduling parameters to the mobile device 104 in the downlink (DL) control channel at 112.

The downlink control channel can carry information about the scheduling grants. As previously discussed, typically this includes a number of MIMO layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, downlink control channel can also carry data in one or more subcarriers of an OFDM control channel symbol to improve efficiency of the control channel. As shown in FIG. 1, the downlink control channel can include data or control channel information. In various embodiments, the systems described herein can provide approaches for the control channel transmission. After such scheduling, the actual data transfer can take place from BS device 102 and/or the network to the mobile device 104 at 114.

Downlink reference signals can be defined signals occupying specific resource elements within the downlink time-frequency grid. There are several types of downlink reference signals that are transmitted in different ways and used for different purposes by the receiving terminal. One type of DL reference signal is a CSI reference signal (CSI-RS): These reference signals are specifically intended to be used by terminals to acquire channel-state information (CSI) and beam specific information (beam RSRP). In 5G, a CSI-RS is mobile device-specific so it can have a significantly lower time/frequency density. Another type of DL reference signal is a demodulation reference signals (DM-RS): These reference signals also sometimes referred to as mobile device-specific reference signals, and are specifically intended to be used by terminals for channel estimation for data channel. The reference signals can be referred to as "mobile device-specific" because each demodulation reference signal is intended for channel estimation by a single terminal. That specific reference signal is then only transmitted within the resource blocks assigned for data traffic channel transmission to that terminal. Other than these reference signals, there are other reference signals, namely Multicast-broadcast single-frequency network (MBSFN) and positioning reference signals used for various purposes.

The uplink (UL) control channel carries information about HARQ-ACK information corresponding to the downlink data transmission, and channel state information. The channel state information typically consists of RI, CQI, and PMI. The DL control channel (PDCCH) carries information about the scheduling grants. Typically this information includes details such as the number of MIMO layers scheduled, transport block sizes, modulation for each codeword, parameters related to HARQ, sub band locations and also PMI corresponding to that sub bands. Note that, all DCI formats may not use transmit all the information as shown above. In general, the contents of PDCCH depends on transmission mode and DCI format.

Figure 2:
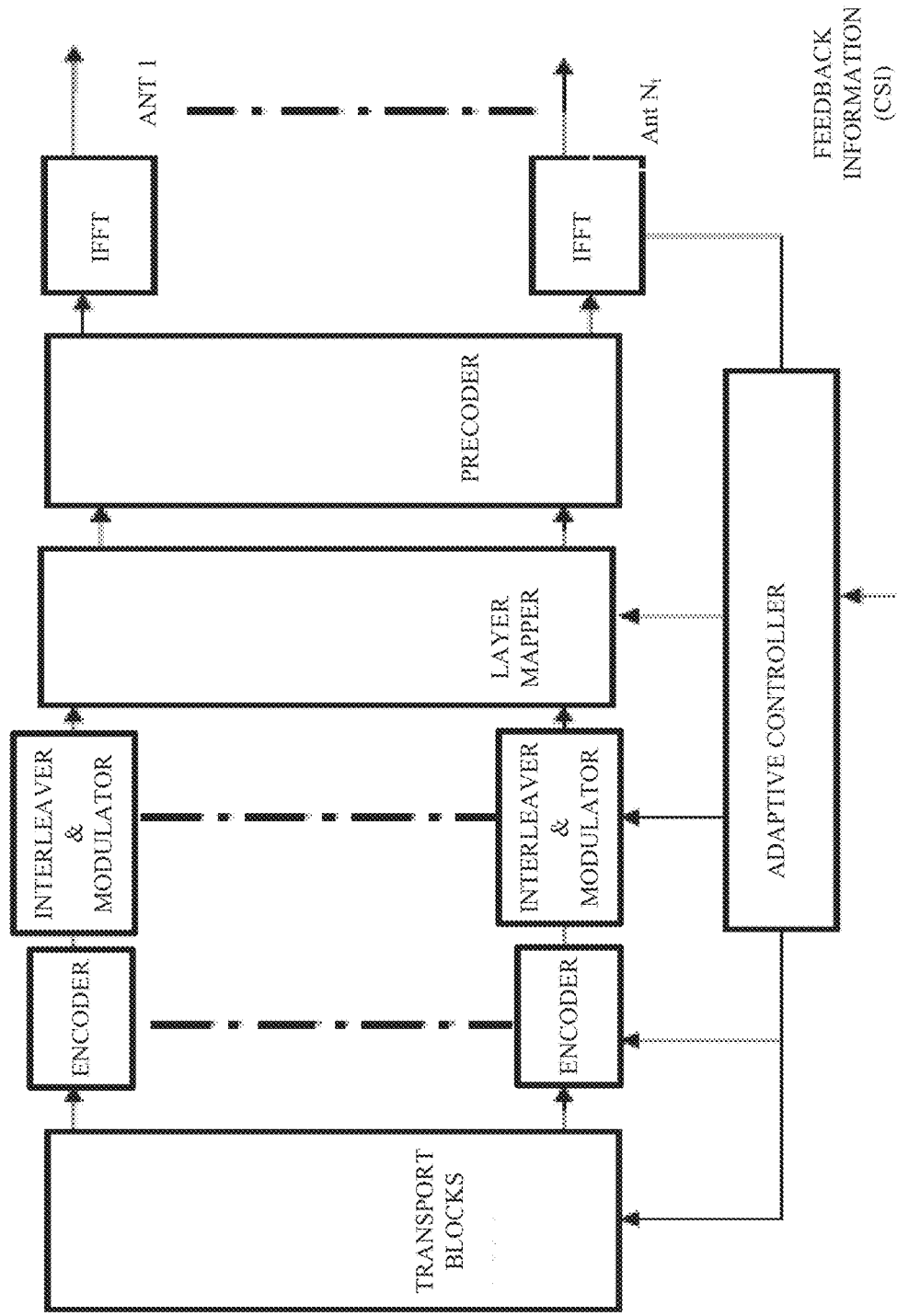
FIG. 2 illustrates an example, non-limiting multiple codeword multiple input multiple output (MIMO) transmitter facilitate dynamic layer mapping with multiple downlink control channels in accordance with one or more embodiments described herein.

FIG. 2 illustrates an example, non-limiting multiple codeword multiple input multiple output (MIMO) transmitter facilitate dynamic layer mapping with multiple downlink control channels in accordance with one or more embodiments described herein. Repetitive description of like elements employed in other embodiments described herein is omitted for sake of brevity.

The system 200 shows the transmission side of a MIMO communication system with $N_t$ transmit antennas, where $N_t$ denotes the number of transmit antennas and Nr denotes the receive antennas. As a result, the peak data rate typically multiplies with a factor of $N_t$ over single antenna systems in rich scattering environment. There are Nc transport blocks, where Nc<=Nt. Cyclic redundancy check (CRC) bits can be added to each transport block and passed to the channel encoder. The channel encoder adds parity bits to protect the data. Then the stream is passed through an interleaver. The interleaver size is adaptively controlled by puncturing to increase the data rate. The adaptation is done by using the information from the feedback channel, for example channel state information sent by the receiver. The interleaved data is passed through a symbol mapper (modulator). The symbol mapper is also controlled by the adaptive controller. After modulator the streams are passed through a layer mapper and the precoder. The resultant streams are then passed through IFFT block. Please note that IFFT block is necessary for some communication systems which implements OFDMA as the access technology (e.g., 5G, LTE/LTE-A), in other systems it might be different and is dependent on the multiple access system. The encoded stream can be then transmitted through the respective antenna.

Figure 3:
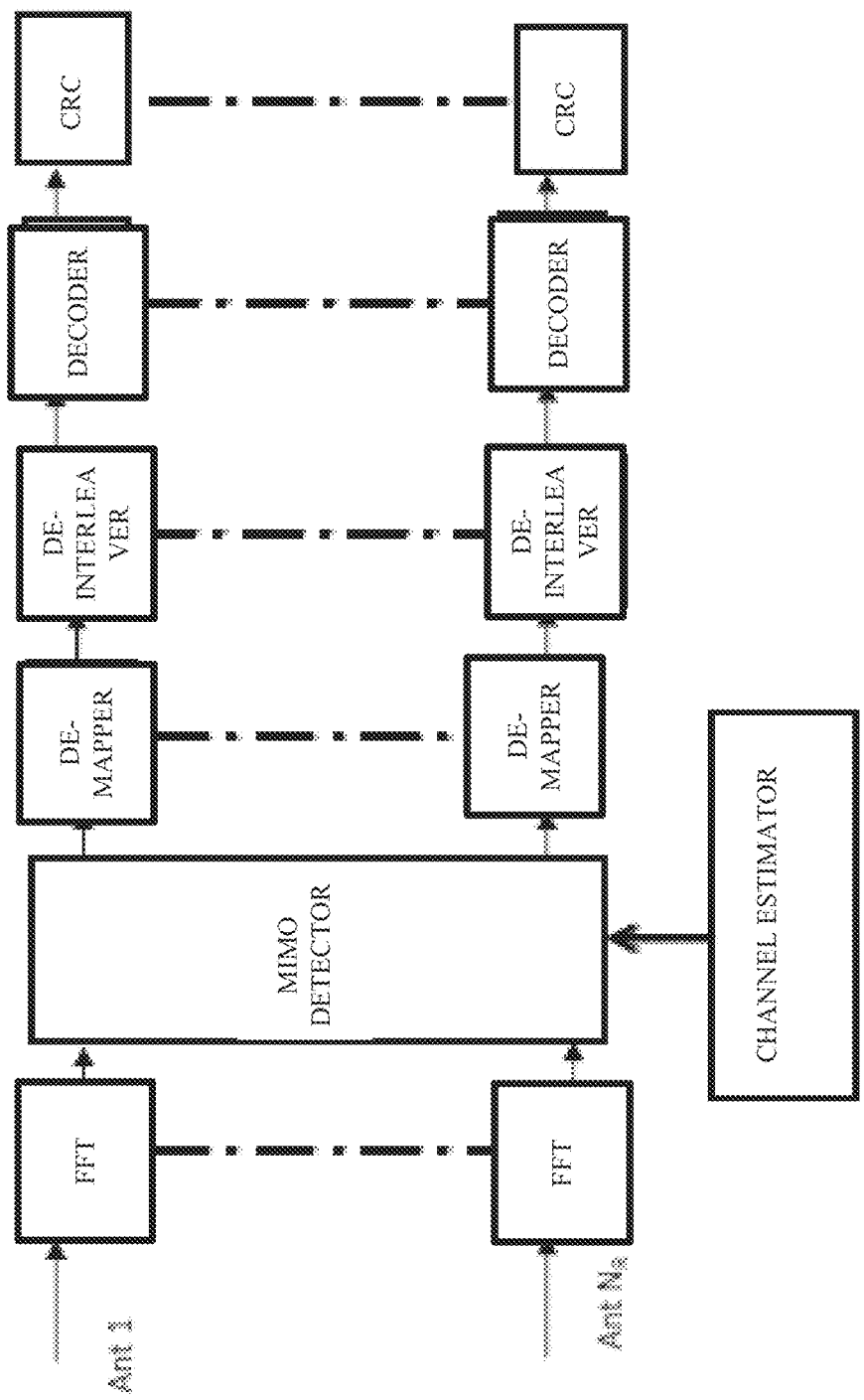
FIG. 3 illustrates an example, non-limiting multiple codeword MIMO receiver without codeword interference cancellation in accordance with one or more embodiments described herein.

FIG. 3 illustrates an example, non-limiting multiple codeword MIMO receiver without codeword interference cancellation in accordance with one or more embodiments described herein. Repetitive description of like elements employed in other embodiments described herein is omitted for sake of brevity.

After the Fast Fourier Transform (FFT) operation, the MIMO detector can be used for reducing the multi antenna interference. The de-mapper computes the bit log likelihood ratios from the MIMO detector output which is in the symbol domain. The bit stream is then de-interleaved and passed to the channel decoder. CRC check is done on the output of the channel decoder. If the CRC is passed the transport block is considered to be passed and an acknowledgment (ACK) is sent back to the transmitter via a feedback channel. If the CRC fails, then an negative acknowledgment (NAK) can be sent back to the transmitter using the feedback channel.

Figure 4:
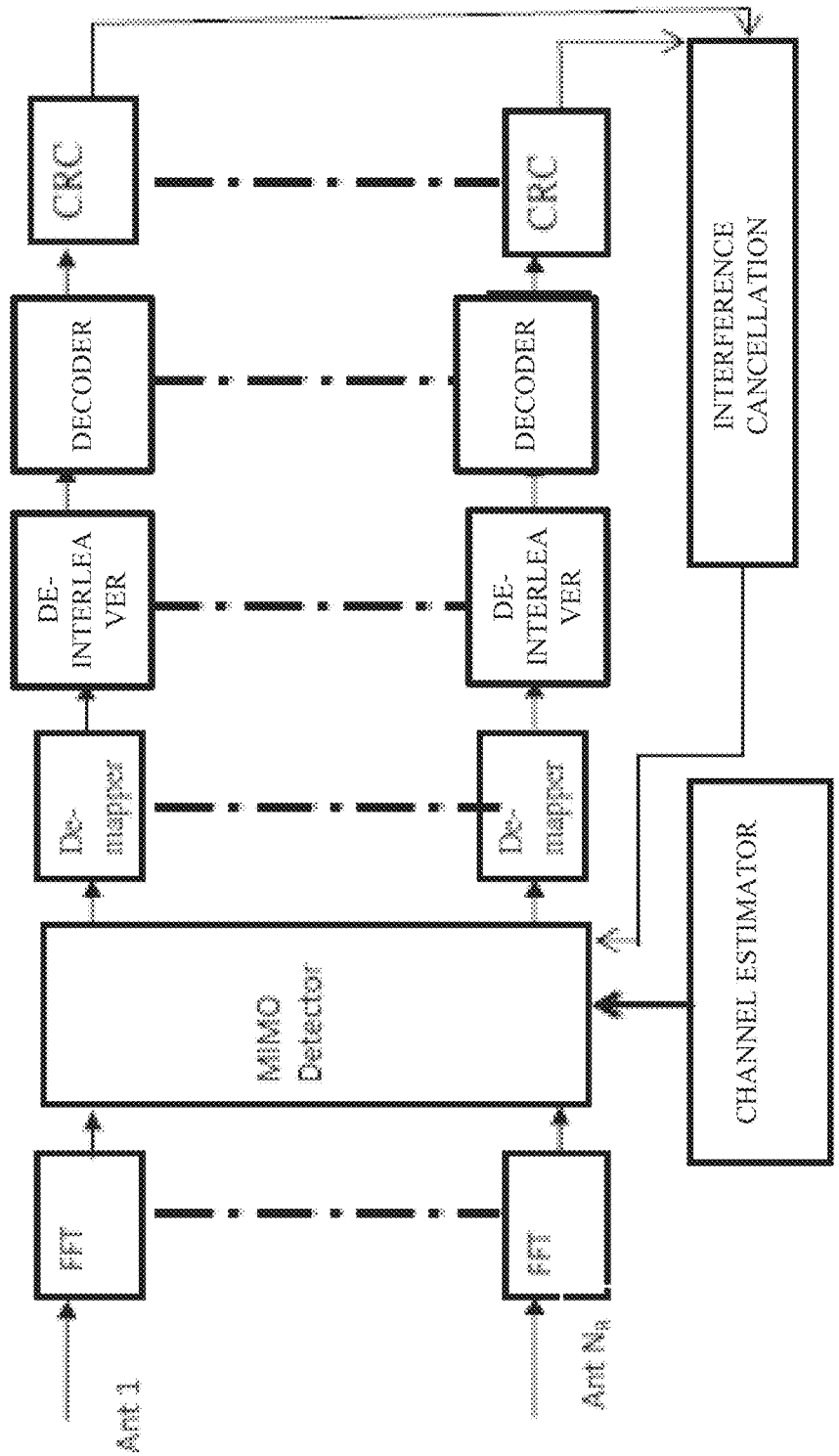
FIG. 4 illustrates an example, non-limiting multiple codeword MIMO receiver with codeword interference cancellation in accordance with one or more embodiments described herein.

FIG. 4 illustrates an example, non-limiting multiple codeword MIMO receiver with codeword interference cancellation in accordance with one or more embodiments described herein. Repetitive description of like elements employed in other embodiments described herein is omitted for sake of brevity.

FIG. 4 illustrates the MIMO receiver with codeword interference cancellation also called serial interference cancellation (SIC), where all the receiver codewords are decoded at the same time (or concurrently). Once the CRC check is made on all the codewords, the codewords whose CRC is a pass are reconstructed and subtracted from the received signal and only those codewords whose CRC is a fail are decoded. This process is repeated till all the codewords are passed or all the codewords are failed or certain pre-determined number of iterations is reached.

Figure 5:
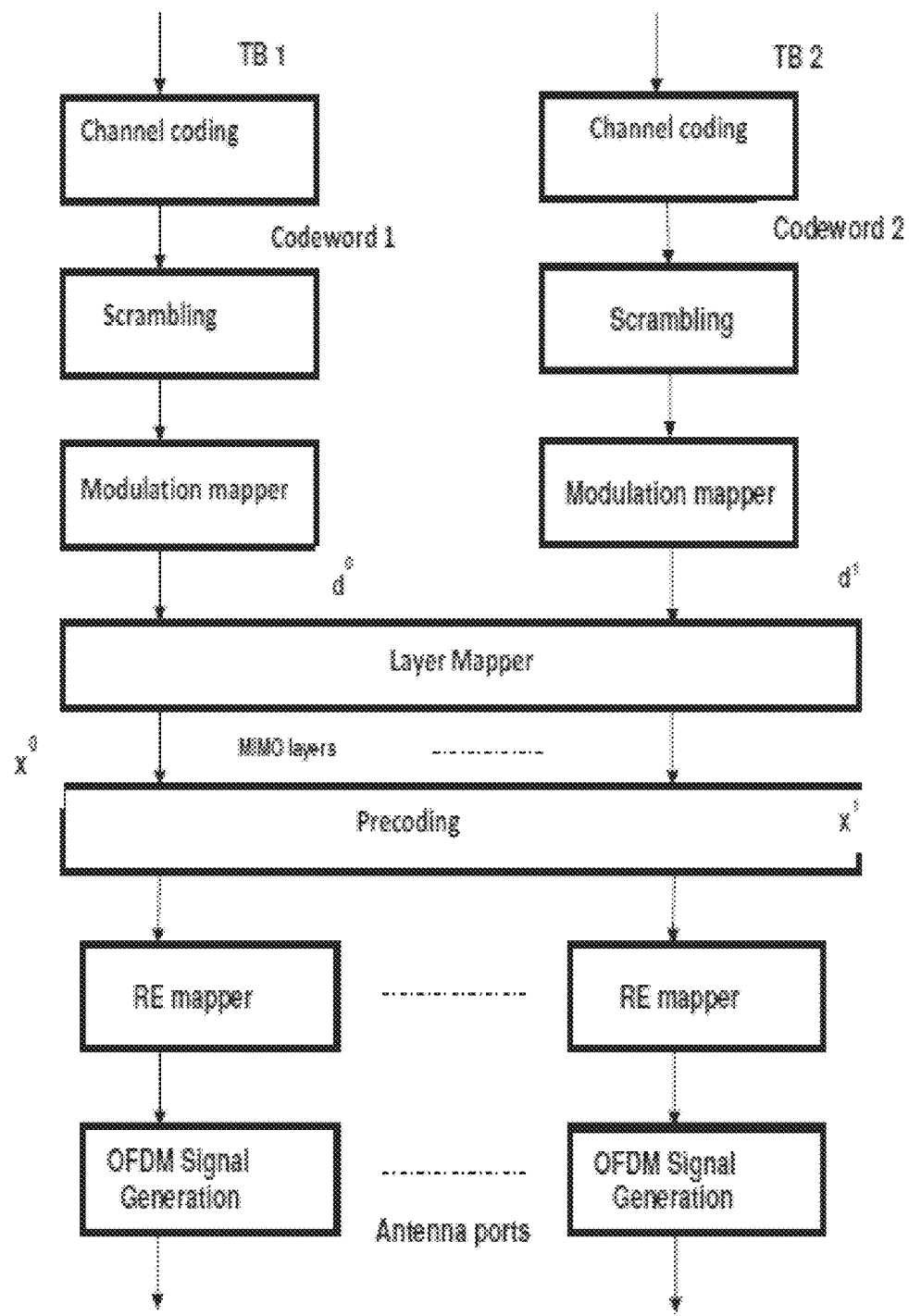
FIG. 5 illustrates an example, non-limiting structure of an LTE downlink MIMO transmission with two codewords in accordance with one or more embodiments described herein.
Figure 6:
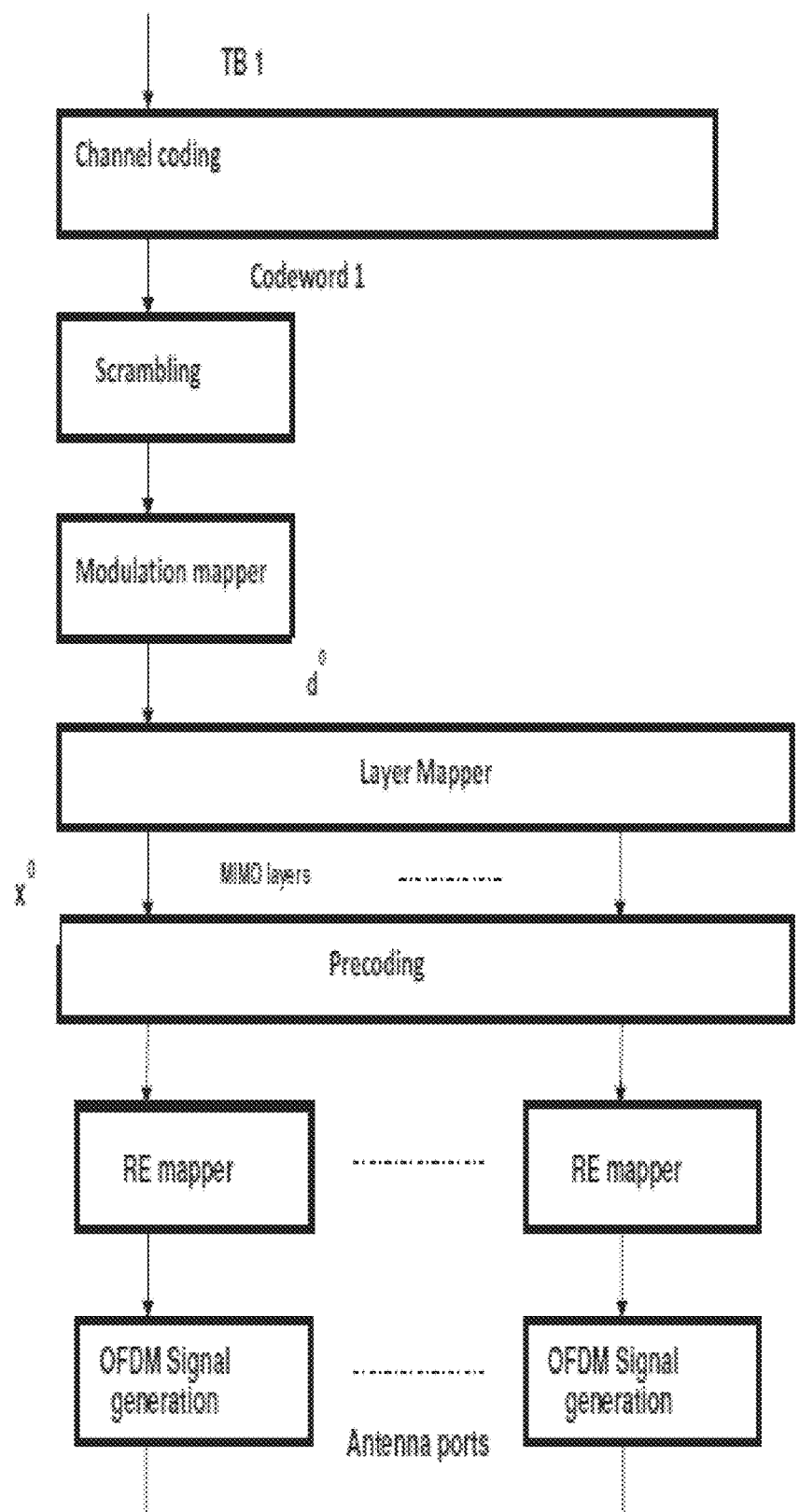
FIG. 6 illustrates an example, non-limiting structure of an 5G downlink MIMO transmission with single codeword in accordance with one or more embodiments described herein.

FIG. 5 illustrates an example, non-limiting structure of an LTE downlink MIMO transmission with two codewords in accordance with one or more embodiments described herein. FIG. 6 illustrates an example, non-limiting structure of an 5G downlink MIMO transmission with single codeword in accordance with one or more embodiments described herein. Repetitive description of like elements employed in other embodiments described herein is omitted for sake of brevity.

Turning first to FIG. 5, with regard to MIMO codeword dimensioning, in general, with multi-codeword MIMO, the feedback channel (both downlink and uplink) overhead is proportional to the transmission rank. For example, if the mobile device reported rank is equal to 4, then the receives needs to report 4 channel quality indicators, similarly the transmitter needs to inform 4 transport block sizes, modulation format, HARQ process numbers, redundancy versions etc. Hence the feedback channel overhead is proportional to the transmission rank. For reducing the overhead, the codeword dimensioning principle was proposed in LTE to bundle the layers and supporting maximum two codewords. Where the codeword is defined as an information block appended with a CRC. Each codeword is separately coded using turbo coding and the coded bits from each codeword are scrambled separately as shown in FIG. 5. The complex-valued modulation symbols for each of the codewords to be transmitted are mapped onto one or multiple layers. The complex-valued modulation symbols $d^{(q)}(0), \ldots, d^{(q)}(M^{(q)}_{symb}-1)$ for code word q are mapped onto the layers $x(i)=[x^{(0)}(i) \ldots x^{(v-1)}(i)]^T$, $i=0, 1, \ldots, M^{layer}_{symb}-1$, where v is the number of layers and $M^{layer}_{symb}$ is the number of modulation symbols per layer. The codeword to layer mapping is as shown in FIG. 9. Note that the main principle behind the LTE codeword dimensioning is that whenever the transmission rank is more than 2, the transport block size is increases to accommodate more number of bits.

Once the layer mapping is done, the resultant symbols are precoded using the selected precoder. The precoded symbols are mapped to resource elements in the OFDM time frequency grid and the OFDM signal is generated. The resulting signal is passed to the antenna ports. Since improving the signaling efficiency is one of the key requirement for 5G systems, we consider single codeword MIMO as an attractive option for 5G systemize extend the LTE codeword dimensioning principle to single codeword rather than two codewords as shown in FIG. 6. A new layer mapping table for example serial to parallel converter can be used.

Figure 7:
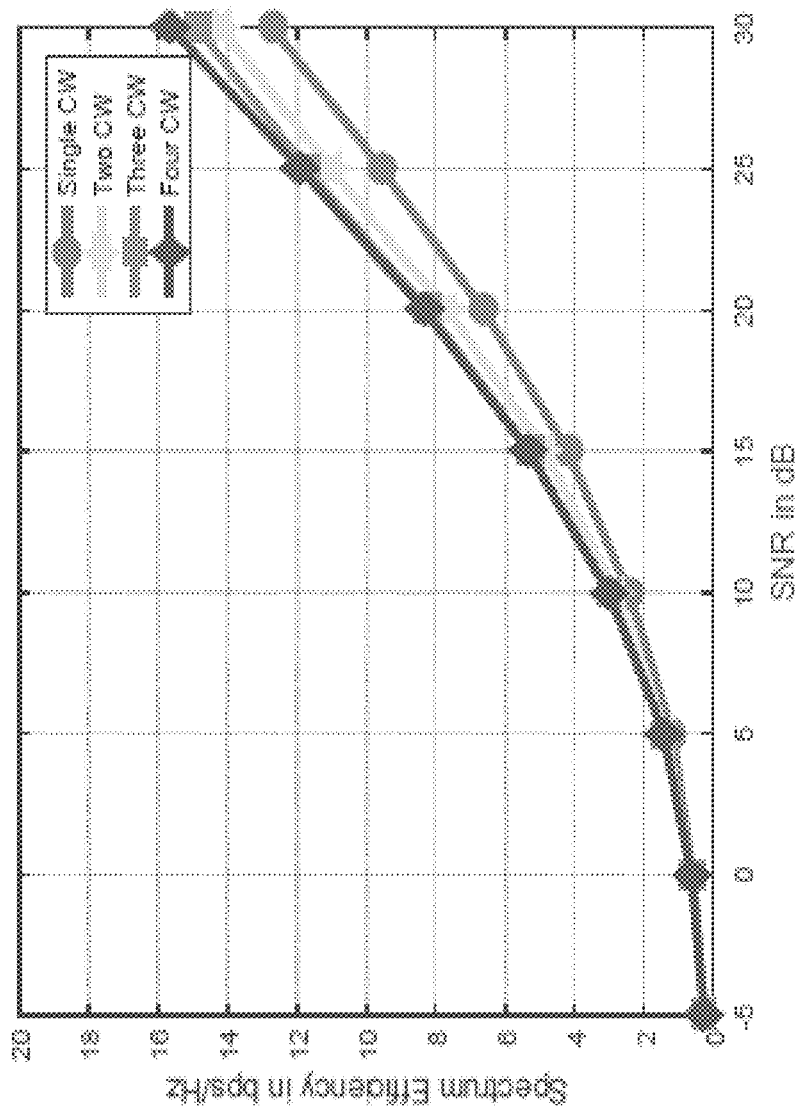
FIG. 7 illustrates an example, non-limiting graph showing spectral efficiency comparison for single codeword and two codeword MIMO in accordance with one or more embodiments described herein.

FIG. 7 illustrates an example, non-limiting graph showing spectral efficiency comparison for single codeword and two codeword MIMO in accordance with one or more embodiments described herein. Repetitive description of like elements employed in other embodiments described herein is omitted for sake of brevity.

FIG. 7 shows the spectral efficiency as a function of SNR for a 4×4 MIMO systems with single codeword, two codeword, three codeword and four codeword. The overhead due to downlink and uplink feedback signaling is typically reduced when MIMO codeword dimensioning is applied. However, the drawback with codeword dimensioning is that the link throughput is impacted as the MIMO layers with different channel qualities are coupled as one codeword. As shown in FIG. 7, at very low signal-to-noise rations (SNRs), the performance with single codeword is almost identical to that of four codewords. This is because at very low SNR (e.g., 0 decibel (dB) or −5 dB) there is a high probability that rank is 1. However, for medium to high SNRs, the performance with a single codeword is inferior to four codewords. For example, at medium SNR of 10 dB, there can be 19% loss in the spectral efficiency compared to 4 codeword MIMO. Similarly, at high SNR of 25 dB, the loss is around 20% compared to the 4 codeword MIMO. The loss is significant because in a single codeword MIMO, the CQI is controlled by the SINR of the weaker layer. Hence an efficient solution is desired to improve the performance of MIMO system without impacting the uplink and downlink feedback channel overhead.

Figure 11:
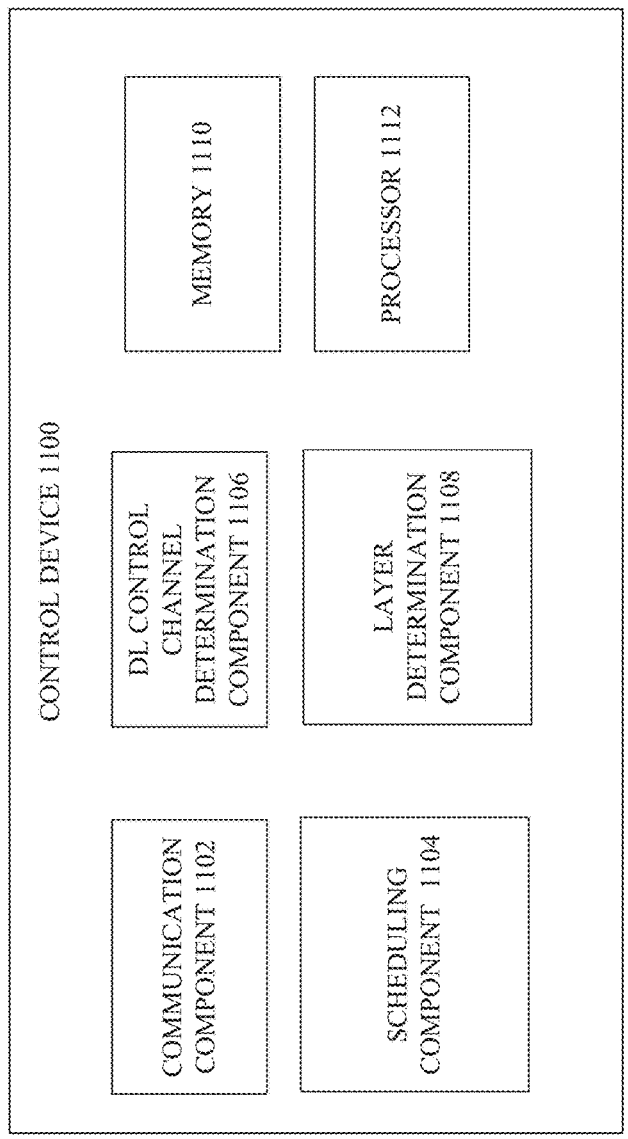
FIG. 11 illustrates an example, non-limiting control device that facilitates dynamic layer mapping with multiple downlink control channels in accordance with one or more embodiments described herein.
Figure 12:
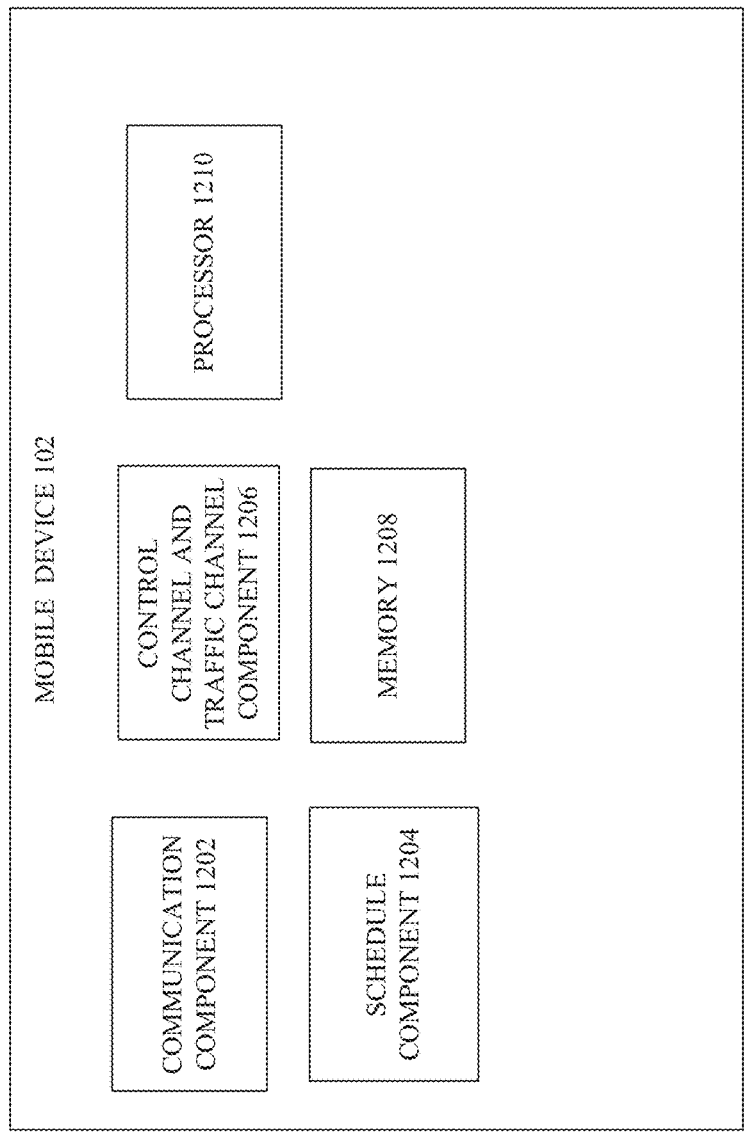
FIG. 12 illustrates an example, non-limiting control device for which dynamic layer mapping with multiple downlink control channels can be facilitated in accordance with one or more embodiments described herein.

One or more of these embodiments will be described with reference to FIGS. 8, 9, 10, 11, 12, 13 and 14. Turning first to FIGS. 8, 9, 11 and 12, FIG. 8 illustrates another example, non-limiting message sequence flow chart to facilitate dynamic layer mapping with multiple downlink control channels in accordance with one or more embodiments described herein. One or more embodiments are described for DL MIMO systems. However, the embodiments can also be practiced in UL and/or side link systems. FIG. 9 illustrates an example, non-limiting table to facilitate dynamic layer mapping with multiple downlink control channels in accordance with one or more embodiments described herein. FIG. 11 illustrates an example, non-limiting control device that facilitates dynamic layer mapping with multiple downlink control channels in accordance with one or more embodiments described herein. FIG. 12 illustrates an example, non-limiting mobile device (e.g., mobile device 104) for which dynamic layer mapping with multiple downlink control channels can be facilitated in accordance with one or more embodiments described herein. Repetitive description of like elements employed in other embodiments described herein is omitted for sake of brevity.

Figure 8:
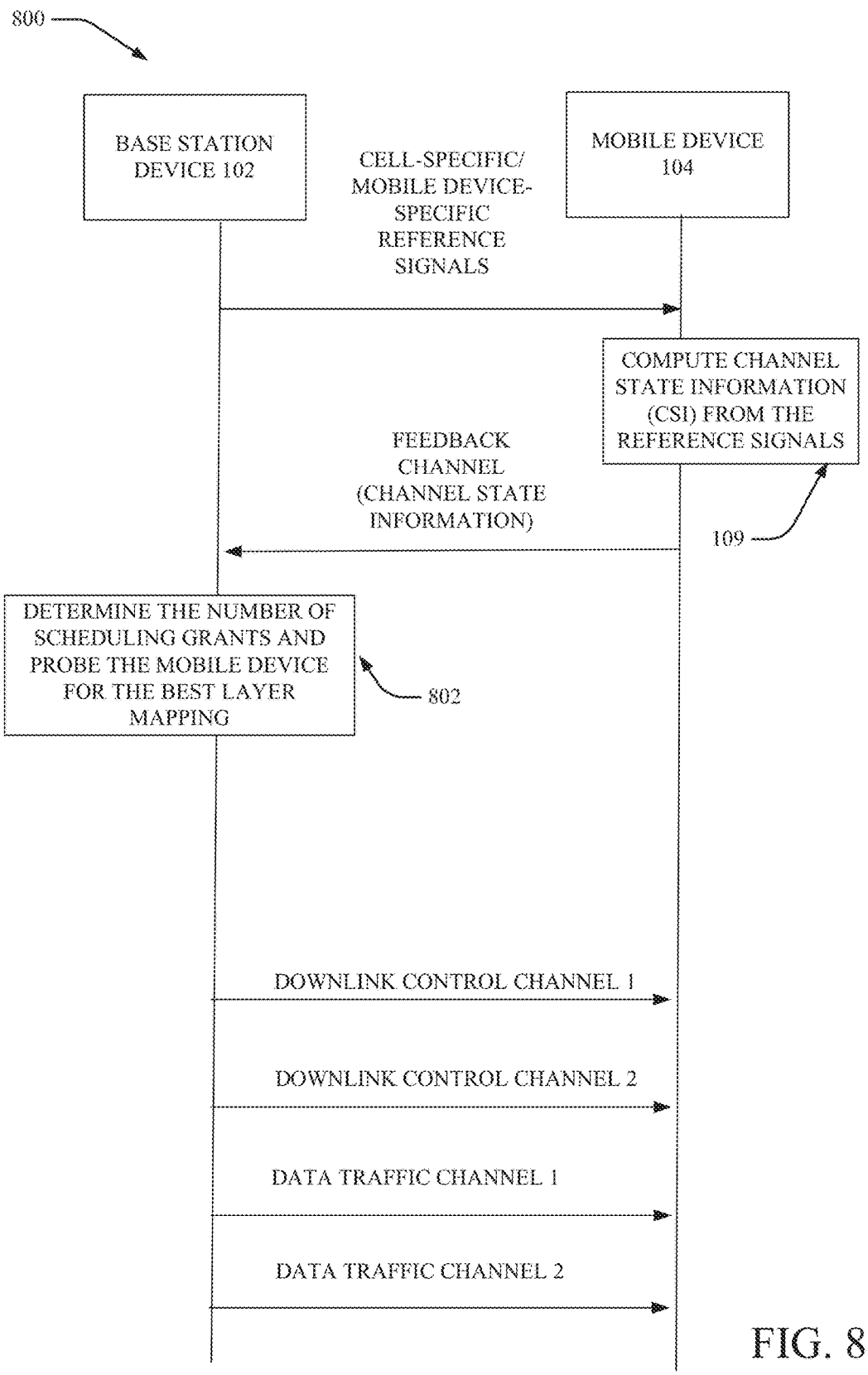
FIG. 8 illustrates another example, non-limiting message sequence flow chart to facilitate dynamic layer mapping with multiple downlink control channels in accordance with one or more embodiments described herein.

For simplicity, the BS device 102 is shown in FIG. 8. However, the BS device 102 can include and/or represent one or more different types or numbers of network nodes. Any type of network node that serves a mobile device (e.g., mobile device 104) and/or is connected to another network node, network element or any radio node from where the mobile device 104 receives a signal is applicable and can be used in exchange for the BS device 102 shown in FIG. 8. Therefore, as used herein, examples of radio network nodes include, but are not limited to, Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), and/or nodes in distributed antenna system (DAS) etc. Similarly, for reception, the mobile device 104 is shown. The mobile device 104 can represent any type of wireless device that communicates with a radio network node in a cellular or mobile communication system. Therefore, examples of mobile devices include, but are not limited to, target devices, device to device (D2D) mobile devices, machine type mobile devices or mobile devices capable of machine-to-machine (M2M) communication, personal digital assistants (PDAs), tablets, mobile terminals, smart phones, laptop embedded equipment (LEE), laptop mounted equipment (LME), universal serial bus (USB) dongles, etc. As used herein, the terms "element," "elements" and "antenna ports" are also interchangeably used but carry the same meaning herein.

As shown in FIG. 11, the control device 1100 can be comprised in the BS device 102 and/or any other network control device can comprise communication component 1102, scheduling component 1104, DL control channel component 1106, layer determination component 1108, memory 1110 and/or processor 1112. In some embodiments, one or more of communication component 1102, scheduling component 1104, DL control channel component 1106, layer determination component 1108, memory 1110 and/or processor 1112 can be electrically and/or communicatively coupled to one another to perform one or more functions of control device 1100.

Turning also to FIG. 12, the mobile device 104 can comprise communication component 1202, schedule component 1204, control channel and traffic channel component 1206, memory 1208 and/or processor 1210. In some embodiments, one or more of communication component 1202, schedule component 1204, control channel and traffic channel component 1206, memory 1208 and/or processor 1210 can be electrically and/or communicatively coupled to one another to perform one or more functions of mobile device 104.

The communication component 302 can transmit and/or receive control and/or data information to and/or from a communication component (e.g., communication component 402) of one or more mobile devices (e.g., mobile device 104). In some embodiments, the communication component 302 and/or communication component 402 can transmit and/or receive CSI-RS processes and/or receive feedback such as that shown in FIG. 8. In some embodiments, communication component 302 can transmit one or more DCI comprising scheduling grants for transmission from the mobile device 104. The communication component 402 can receive one or more downlink control channels.

Turning now to FIG. 8 as shown, the difference between system 800 of FIG. 8 and system 100 of FIG. 1 is that rather than using a configuration in which a single scheduling grant is indicated for a single downlink control channel for supporting multiple codeword MIMO, the scheduling component 1104 of the BS device 102 can employ multiple scheduling grants and multiple downlink control channels where each downlink control structure is the same as that of single codeword. This results in gains due to multiple codeword MIMO. For example, shown in FIG. 8 is multiple codeword MIMO with multiple scheduling grants (FIG. 8 only shows two scheduling grants and two data traffic channels, however, the same concept can be extended to multiple scheduling grants and multiple data traffic channels). The number of scheduling grants shown in FIG. 2 is two scheduling grants (one for each data traffic channel). In other embodiments, any number of scheduling grants can be determined and/or provided by the scheduling component 1104 of the BS device 102 in accordance with the number of data traffic channels to be scheduled. As also shown in FIG. 8, at 802, the scheduling component 1104 of the BS device 102 of system 800 can determine a number of scheduling grants to transmit to the mobile device 104. The layer determination component 1108 of the BS device 102 can also probe the mobile device 104 to determine a particular layer mapping. In some embodiments, the layer determination component 1108 of the BS device 102 can probe the mobile device 104 to determine the best layer mapping.

In FIG. 8, in system 800, the DL control channel determination component 1106 of the BS device 102 can identify whether, for a particular mobile device (e.g., mobile device 104), whether the BS device 102 wants to transmit multiple or single DL control channels. Thus, the DL control channel determination component 1106 of the BS device 102 can determine the DL control channel configuration to employ for a particular mobile device. In some embodiments, if there is lower rank (e.g., rank 1 or 2), the BS device 102 can employ single DL control channel; if there is higher rank, the BS device 102 can employ multiple DL control channels.

As a second step, once the DL control channel determination component 1106 of the BS device 102 determines that multiple DL control channels are to be employed, the layer determination component 1108 of the BS device 102 can select a layer to couple to the DL control channel (e.g., layers 1 and 4, layers 1 and 3 or layers 1 and 2, as examples). As a third step, once the layer determination component 1108 of the BS device 102 has selected the layer to couple to the DL control channel, the scheduling component 1104 of the BS device 102 can then schedule that layer for the mobile device 104.

As shown in FIG. 8, as a first step, the layer determination component 1108 of the BS device 102 can determine whether to probe the mobile device 104 for a particular layer mapping (e.g., the best layer mapping). The scheduling component 1104 BS device 102 can determine the number of scheduling grants and number of data traffic channels. For example, the BS device 102 can determine the number of codewords based on rank. For example, for rank 1 and 2, the BS device 102 can determine that only one (e.g., a single) control channel is to be employed. Employing one DL control channel can mean indicting one codeword. This implies employing only one codeword for rank 1 and 2, and for rank 3 and 4, employing two DL control channels. Employing two DL control channels can mean employing two codewords.

In another embodiment, the DL control channel determination component 1106 of the BS device 102 can determine the number of DL control channels to employ based on long-term signal-to-interference noise ratio (SINR), path loss of the mobile device 104 and/or the position of the mobile device 104. For example, if the mobile device 104 is located at a BS device 102 cell edge or has path loss higher than a defined value (or path loss that is considered to be high by those skilled in the art), then the BS device 102 can employ only one control channel. As another example, if the mobile device 104 is located at the BS device 102 cell center or has path loss lower than a defined value (or that is considered to be low by those skilled in the art) then the BS device 102 ca employ multiple control channels.

In some embodiments, after the DL control channel determination component 1106 of the BS device 102 determines the number of multiple DL control channels, each DL control channel can schedule only one codeword (e.g., a single codeword MIMO control channel can be employed). For example, in one embodiment, a rank 4 MIMO can be scheduled with 2 downlink control channels and 2 data traffic channels, where each data traffic channel is of rank 2 with single codeword. If the number of control channels is more than one, then the BS device 102 can map the right layers to each codeword. This is because the feedback channel from the mobile device 104 is single codeword (meaning one CQI for all the layers), while the BS device 102 employs multiple downlink control information (DCIs) the BS device 102 does not have the knowledge as to which layers should be mapped to the right codeword (or the physical downlink shared channel (PDSCH)). For this purpose, in one or more embodiments, the BS device 102 can probe the mobile device 104 for the best layer mapping.

The layer determination component 1108 of the BS device 102 can probe the mobile device 104 to select best layer mapping. For example, for probing the mobile device 104 to select the best layers mapping scheme, the BS device 102 can send multiple CSI-RS processes, where each CSI-process is configured to have one particular configuration. For example, if the BS device 102 would like to identify the best layer mapping combination for 4×4 MIMO with rank 4, then the BS device 102 can send one CSI-process with antenna ports 1 and 2. For this CSI-RS transmission, the mobile device 104 can then feedback the CQI corresponding to the rank 2 transmission. For these purposes, this can be referred to as "CQI1a." The same process can be repeated by the BS device 102 for ports 3 and 4 (either simultaneously or sequentially). For these purposes, the CQI feedback by the mobile device 104 can be considered to be "CQI1b." The following can be defined: CQI1=CQI1a+CQI1b. Similarly, for the second CSI process, the mobile device 104 can send a feedback CQI2a and CQI2b and so on.

As shown in FIG. 9, then the BS device 102 can select the best combination among the three candidate combinations. In some embodiments, the best combination is the combination having the highest CQI. So, for example, if CQI1>CQI2>CQI3, then the BS device 102 can select the combination one for mapping the layers to the correct DCI/PDSCH.

Turning back to FIG. 8, the BS device 102 can then transmit data using the best layer mapping. Once the network identifies the best layers for mapping to the correct PDSCH are determined, the schedule component 1104 of the BS device 102 can schedule the mobile device 104. Note that there is no explicit indication of this mapping to the mobile device 104 as the BS device 102 can indicate which DM-RS ports in each DL control channel. In the above example, the BS device 102 can indicate DM-RS for ports 1 and 2 in the first DCI and schedule the mobile device 104 with rank 2 transmission. Similarly, the other DCI indicates ports 3 and 4 with rank 2 transmission. Note that the BS device 102 can choose this combination over a period of time and choose to probe the mobile device 104 for best layer mapping periodically (to reduce the overhead) or the BS device 102 can do this layer mapping aperiodically. For example, if the BS device 102 identifies that the mobile device 104 is moving with a slow speed, then the same layer mapping can be kept constant for longer periods of time.

The memory 1110 can be a computer-readable storage medium storing computer-executable instructions and/or information configured to perform one or more of the functions described herein with reference to the control device 1100. For example, in some embodiments, the memory 1110 can store computer-readable storage media associated with determining whether to employ multiple or single DL control channels, determining the best layer mapping and the like. The processor 1112 can perform one or more of the functions described herein with reference to the control device 1100.

The memory 1208 can be a computer-readable storage medium storing computer-executable instructions and/or information configured to perform one or more of the functions described herein with reference to the mobile device 104. For example, in some embodiments, the memory 1208 can store computer-readable storage media associated with determining and/or transmitting feedback for selection of best layer mapping and the like. The processor 1210 can perform one or more of the functions described herein with reference to the mobile device 104.

Figure 10:
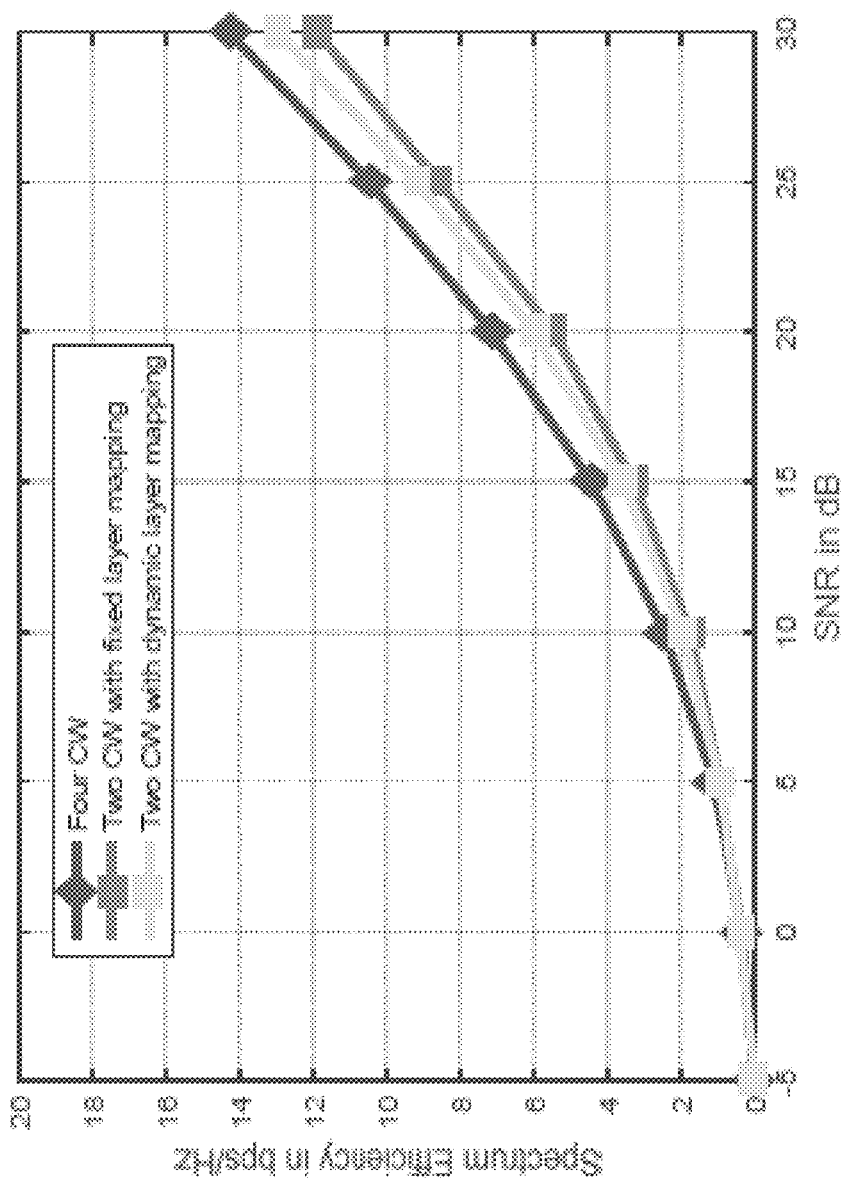
FIG. 10 illustrates an example, non-limiting graph showing spectral efficiency comparison with best layer mapping in accordance with one or more embodiments described herein.

FIG. 10 illustrates an example, non-limiting graph showing spectral efficiency comparison with best layer mapping in accordance with one or more embodiments described herein. FIG. 10 shows the performance of the dynamic layer mapping. As shown, the performance is better than two codeword and single codeword without much overhead as that of four codeword.

Figure 13:
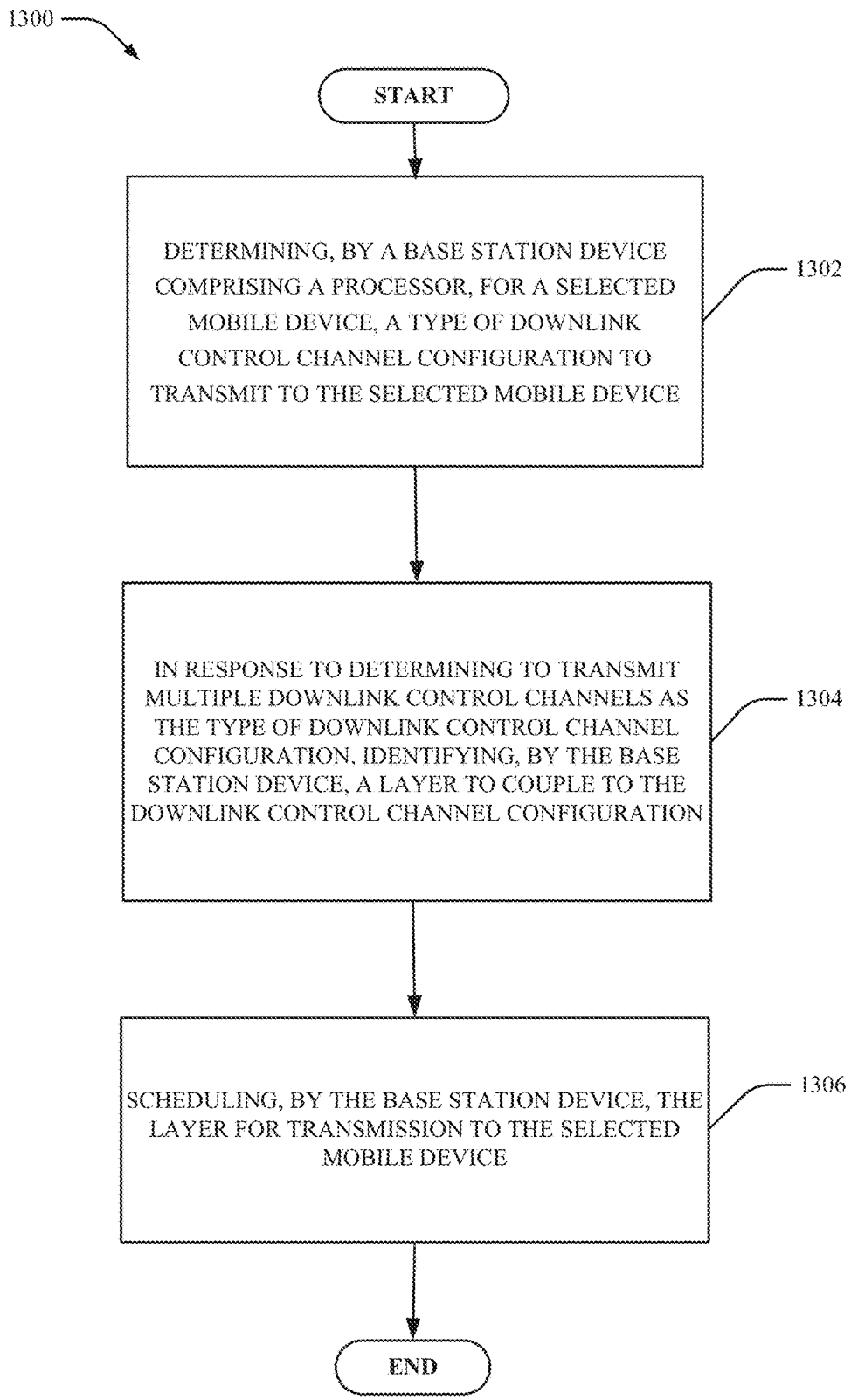
FIG. 13 illustrates an example, non-limiting flowchart of a method that illustrates an example, non-limiting control device that facilitates dynamic layer mapping with multiple downlink control channels in accordance with one or more embodiments described herein.

FIG. 13 illustrates an example, non-limiting flowchart of a method that illustrates an example, non-limiting control device that facilitates dynamic layer mapping with multiple downlink control channels in accordance with one or more embodiments described herein. At 1302, method 1300 can comprise determining, by a base station device comprising a processor, for a selected mobile device, a type of downlink control channel configuration to transmit to the selected mobile device. In some embodiments, determining the type of downlink control channel configuration to transmit comprises: determining to transmit multiple downlink control channels based on a determination that a rank is higher than a defined value; and determining to transmit a single control channel in lieu of transmitting the multiple control channels based on a determination that the rank is less than or equal to the defined value.

At 1304, method 1300 can comprise, in response to determining to transmit multiple downlink control channels as the type of downlink control channel configuration, identifying, by the base station device, a layer to couple to the downlink control channel configuration. At 1306, method 1300 can comprise scheduling, by the base station device, the layer for transmission to the selected mobile device.

Figure 14:
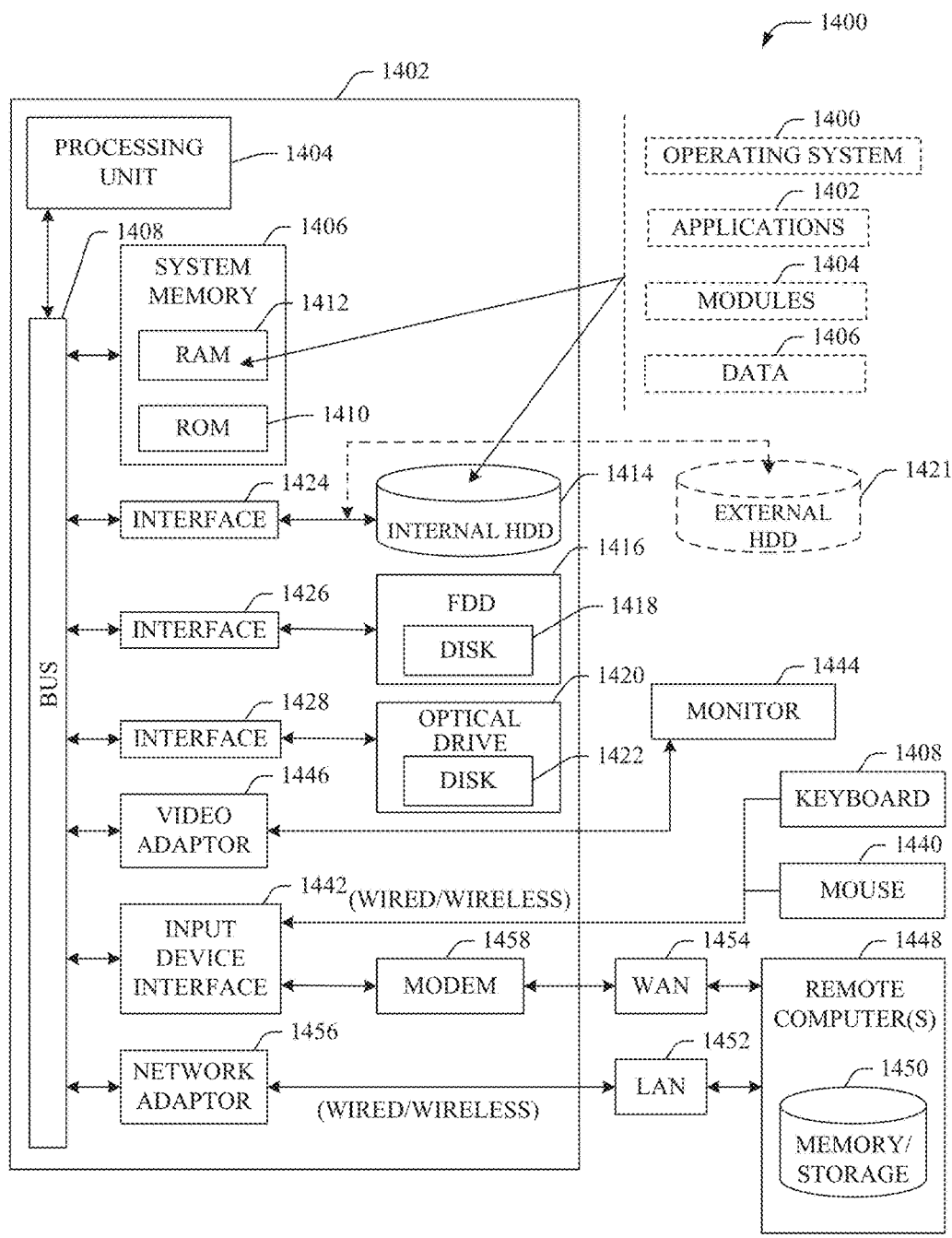
FIG. 14 illustrates a block diagram of a computer that can be employed in accordance with one or more embodiments described herein.

FIG. 14 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 14, the example environment 1400 for implementing various embodiments of the embodiments described herein comprises a computer 1402, the computer 1402 comprising a processing unit 1404, a system memory 1406 and a system bus 1408. The system bus 1408 couples system components comprising, but not limited to, the system memory 1406 to the processing unit 1404. The processing unit 1404 can be any of various commercially available processors. Dual microprocessors and other multiprocessor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 comprises ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also comprise a high-speed RAM such as static RAM for caching data.

The computer 1402 further comprises an internal hard disk drive (HDD) 1410 (e.g., EIDE, SATA), which internal hard disk drive 1414 can also be configured for external use in a suitable chassis (not shown), a magnetic floppy disk drive 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface, respectively. The interface 1424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1402, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1412, comprising an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

A communication device can enter commands and information into the computer 1402 through one or more wired/wireless input devices, e.g., a keyboard 1438 and a pointing device, such as a mouse 1440. Other input devices (not shown) can comprise a microphone, an infrared (IR) remote control, a joystick, a game pad, a stylus pen, touch screen or the like. These and other input devices are often connected to the processing unit 1404 through an input device interface 1442 that can be coupled to the system bus 1408, but can be connected by other interfaces, such as a parallel port, an IEEE 1394 serial port, a game port, a universal serial bus (USB) port, an IR interface, etc.

A monitor 1444 or other type of display device can be also connected to the system bus 1408 via an interface, such as a video adapter 1446. In addition to the monitor 1444, a computer typically comprises other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically comprises many or all of the elements described relative to the computer 1402, although, for purposes of brevity, only a memory/storage device 1450 is illustrated. The logical connections depicted comprise wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also comprise a wireless AP disposed thereon for communicating with the wireless adapter 1456.

When used in a WAN networking environment, the computer 1402 can comprise a modem 1458 or can be connected to a communications server on the WAN 1454 or has other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a base station device comprising a processor, for a selected mobile device, a type of downlink control channel configuration to transmit to the selected mobile device, wherein the determining the type of downlink control channel configuration to transmit comprises:
      determining to transmit multiple downlink control channels as the type based on a determination indicating that a rank is higher than a defined value, and
      determining to transmit a single control channel, in lieu of transmitting the multiple downlink control channels, as the type based on the determination indicating that the rank is not higher than the defined value; and
   in response to the determining the type of downlink control channel configuration comprising the determining to transmit the multiple downlink control channels, identifying, by the base station device, a layer to couple to the downlink control channel configuration.

2. The method of claim 1, further comprising:
   scheduling, by the base station device, the layer for transmission to the selected mobile device.

3. The method of claim 1, wherein the determination is a first determination, and wherein the determining the type of downlink control channel configuration to transmit further comprises:
   determining to transmit the multiple downlink control channels based on a second determination that a location of the selected mobile device is within a defined area of a coverage area of the base station device.

4. The method of claim 3, wherein the determining the type of downlink control channel configuration to transmit further comprises:
   determining to transmit the single control channel based on the second determination that the location of the selected mobile device is not within the defined area of the coverage area of the base station device.

5. The method of claim 1, wherein the determination is a first determination, and wherein the determining the type of downlink control channel configuration to transmit further comprises:
   determining to transmit the multiple downlink control channels based on a second determination that a path loss for the selected mobile device is lower than a defined value; and
   determining to transmit the single control channel based on the second determination that the path loss for the selected mobile device is higher than the defined value.

6. The method of claim 1, wherein the identifying the layer to couple to the downlink control channel configuration further comprises:
   determining which of multiple channel state information reference signals satisfies a defined condition.

7. A base station device, comprising:
   a processor; and
   a memory that stores executable instructions that, when executed by the processor, facilitate performance of operations, comprising:
      determining, for a selected mobile device, a type of downlink control channel configuration to transmit to the selected mobile device; and
      in response to the determining indicating to transmit multiple downlink control channels as the type of downlink control channel configuration, identifying, by the base station device, a layer to couple to the downlink control channel configuration, wherein the determining the type of downlink control channel configuration to transmit comprises:
         determining to transmit the multiple downlink control channels based on a rank being determined not to be lower than a defined value, and
         determining to transmit a single control channel in lieu of transmitting the multiple downlink control channels based on the rank being determined to be lower than the defined value.

8. The base station device of claim 7, wherein the operations further comprise:
   scheduling the layer for transmission to the selected mobile device.

9. The base station device of claim 7, wherein the determining the type of downlink control channel configuration to transmit further comprises:
   determining to transmit the multiple downlink control channels based on a location of the selected mobile device being determined to be within a defined area of a coverage area of the base station device.

10. The base station device of claim 9, wherein the determining the type of downlink control channel configuration to transmit further comprises:
    determining to transmit the single control channel based on the location of the selected mobile device being determined not to be within the defined area of the coverage area of the base station device.

11. The base station device of claim 7, wherein the determining the type of downlink control channel configuration to transmit further comprises:
    determining to transmit the multiple downlink control channels based on a path loss for the selected mobile device being determined to be lower than a defined value; and
    determining to transmit the single control channel based on the path loss for the selected mobile device being determined not to be lower than the defined value.

12. The base station device of claim 7, wherein the identifying the layer to couple to the downlink control channel configuration further comprises:
    determining a channel state information reference signal of multiple channel state information reference signals that satisfies a defined condition.

13. A non-transitory machine-readable storage medium, comprising executable instructions that, when executed by a processor of a base station cell device, facilitate performance of operations, comprising:
    determining, for a selected mobile device, a type of downlink control channel configuration to transmit to the selected mobile device; and
    in response to determining to transmit multiple downlink control channels as the type of downlink control channel configuration, identifying a layer to couple to the downlink control channel configuration, wherein the determining the type of downlink control channel configuration to transmit comprises:
       determining to transmit the multiple downlink control channels based on a determination indicating that a rank is higher than a defined value, and
       determining to transmit a single control channel in lieu of transmitting the multiple downlink control channels based on the determination indicating that the rank is less than or equal to the defined value.

14. The non-transitory machine-readable storage medium of claim 13, wherein the operations further comprise:

scheduling the layer for transmission to the selected mobile device.

15. The non-transitory machine-readable storage medium of claim 13, wherein the determination is a first determination, and wherein the determining the type of downlink control channel configuration to transmit further comprises:
determining to transmit the multiple downlink control channels based on a second determination indicating that a location of the selected mobile device is within a defined area of a coverage area of the base station cell device.

16. The non-transitory machine-readable storage medium of claim 15, wherein the determining the type of downlink control channel configuration to transmit further comprises:
determining to transmit the single control channel in lieu of the transmitting the multiple control channels based on the second determination indicating that the location of the selected mobile device is not within the defined area of the coverage area of the base station device.

17. The non-transitory machine-readable storage medium of claim 13, wherein the determination is a first determination, and wherein the determining the type of downlink control channel configuration to transmit further comprises:
determining to transmit the multiple downlink control channels based on a second determination indicating that a path loss for the selected mobile device is lower than a defined value.

18. The non-transitory machine-readable storage medium of claim 17, wherein the determining the type of downlink control channel configuration to transmit further comprises:
determining to transmit the single control channel in lieu of the transmitting the multiple control channels based on the second determination indicating that the path loss for the selected mobile device satisfies a defined condition.

19. The non-transitory machine-readable storage medium of claim 18, wherein the defined condition comprises the path loss being higher than the defined value.

20. The non-transitory machine-readable storage medium of claim 13, wherein the identifying the layer to couple to the downlink control channel configuration further comprises:
determining which of multiple channel state information reference signals satisfy a defined condition.

* * * * *